Jan. 31, 1928.

W. ERNI 1,657,529

COASTER WAGON

Filed Aug. 4, 1924

INVENTOR.
Walter Erni
BY
Erwin, Wheeler & Woolard
ATTORNEYS

Patented Jan. 31, 1928.

1,657,529

UNITED STATES PATENT OFFICE.

WALTER ERNI, OF PRAIRIE DU CHIEN, WISCONSIN.

COASTER WAGON.

Application filed August 4, 1924. Serial No. 729,902.

This invention relates to improvements in coaster wagons.

Coaster wagons have heretofore generally been made with a tongue adapted in one position to be used in drawing the wagon and, in another position, to rest upon the front of the wagon box and to be utilized by an occupant of the wagon for the guidance thereof. As such tongues are usually constructed they are subject to excessive wear, and so likewise is the wagon box upon which they rest when the wagon is being used for coasting. Other arrangements have been attempted, in which a handle or wheel has been attached to a vertically extended king pin, but in such arrangements the handle has not generally been suitable for use both in drawing the wagon and also for use by an occupant of the wagon. One of the objects of the present invention resides in the novel and improved arrangement whereby a single handle, without pivotal joints, may be utilized conveniently for drawing the wagon and for guiding it under conditions like those existing when the wagon is used for coasting.

More particularly stated, it is an object of this invention to provide a coaster wagon structure in which a vertical shaft similar to an extended king pin is connected rigidly with the front axle and is provided at its upper end with a rigidly connected handle, the handle being arranged at an angle such as to adapt it for use under the circumstances above mentioned and the shaft being relieved of all strains other than those incident to the drawing or guiding of the vehicle.

Further objects of this invention are to provide a novel and improved bolster structure; to provide a novel and improved fifth wheel having a self centering arrangement, whereby to relieve the steering shaft of strains; and to provide a novel and improved means for utilizing inherent structural features of the bolster and fifth wheel for securing a miniature bumper rigidly to the device.

In the drawings.

Like parts are identified by the same reference characters throughout the several views.

Figure 1:
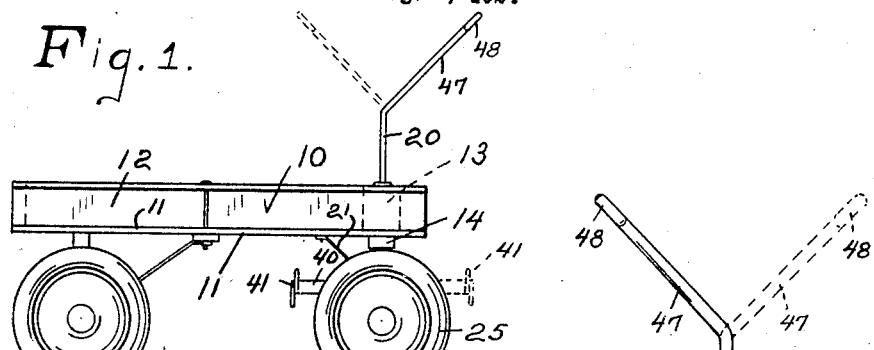
Figure 1 is a side elevation of a wagon embodying this invention.
Figure 2:
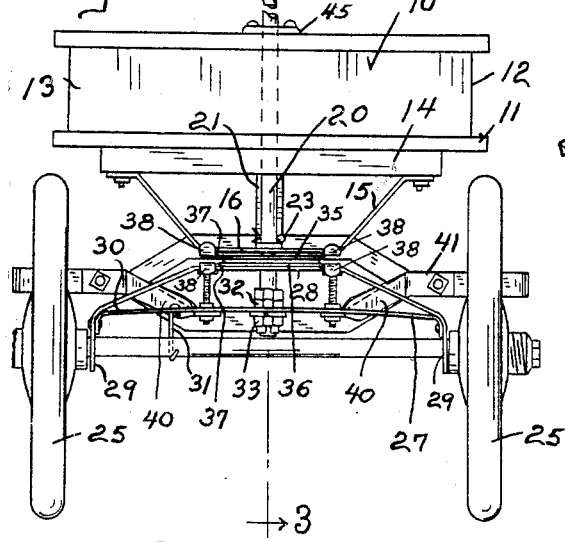
Figure 2 is a front elevation thereof on an enlarged scale.

The wagon box, designated in its entirety by the reference character 10, is made up of a bottom 11, sides 12, and a front wall including a block 13. Beneath the bottom 11 of the wagon is a strip 14 which will preferably correspond in width and length to block 13.

The front bolster may conveniently comprise a strip of strap iron 15 bolted at its ends to block 14 and extending thence downwardly from each end to a central horizontal portion 16. The horizontal portion is provided with a central aperture registering with an aperture in block 13 to receive the steering shaft 20. A brace 21 is also apertured to receive said shaft and is fastened to the bottom 11 at 22. The cotter pin 23, passing through the shaft 20 immediately above the brace, secures against relative upward axial movement the end of the brace and the central part of the bolster 15.

The front axle 24 carries wheels 25 which may be independently rotatable thereon, if desired. The lower bolster 27 has a portion 28 substantially parallel to the portion 16 of bolster 15. Bolster 27 extends from its central horizontal portion 28 downwardly upon either side of such portion at an inclination in the direction of the bearings for wheels 25. Adjacent such bearings the bolster 27 is bent to form the vertical axle engaging members 29. The bolster is re-enforced by the strap 30 which extends in the direction of the axle immediately thereabove and is fastened at its ends by riveting or welding it to the main bolster element 27, as indicated. The wheels 25 being rotatable, the axle may be secured against rotation and the consequent wearing of members 29 by the provision of a link 31 passing through a suitable aperture in the axle and interlocked with the bracing member 30.

The shaft 20 is threaded at its end and is provided with upper and lower lock nuts 32 and 33 engaging the bracing member 30, whereby to impart to said member and to the axle 24 the rotative movement of shaft 20.

Figure 4:
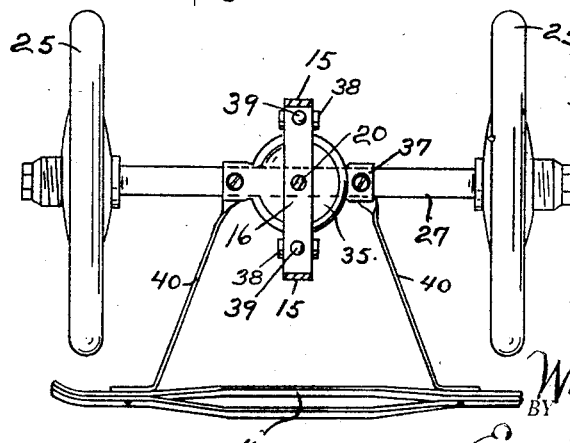
Figure 4 is a detail view taken on the section indicated at 4—4 in Figure 3.

The fifth wheel comprises a pair of similar disks 35 and 36 which are interposed in superimposed relation between bolsters 15 and 27. The disks are apertured to receive shaft 20 and are keyed respectively to the upper and lower bolsters by means of arms 37 formed integrally with the disks and extending radially therefrom at opposite points. Each of the arms 37 is provided with ears 38 engaging the adjacent portions of the bolster to which the given disk is attached. Additional security is afforded by riveting arms 37 of disk 35 to bolster portion 16, as indicated at 39 in Figure 4. The arms 37 of disk 36 may conveniently be bolted to the portion 28 of bolster 27 and the bolts may extend downwardly into interlocking engagement with the brace member 30, whereby to rigidify the entire structure, and, furthermore, to support the arms 40 of the bumper 41.

The fifth wheel is rendered self centering to relieve shaft 20 of side strains by forming one of the disks with an annular rib and the other with a corresponding annular groove. The disks may conveniently be made of stampings and, in that event, each will be formed integrally with an annular fold as at 44 in Figure 3, such folds being adapted to provide in the superposed disks, an interacting rib and groove.

It has been found that the type of fifth wheel illustrated is such as to make the wagon to which it is applied very readily dirigible and also very stable. The stability of the wagon is enhanced by the extended bearing provided for the shaft 20 which is steadied not only by brace 21 but by its passage through blocks 13 and 14 in the wagon box, and by the metallic bearing member 45 applied to the top of the box.

Figure 3:
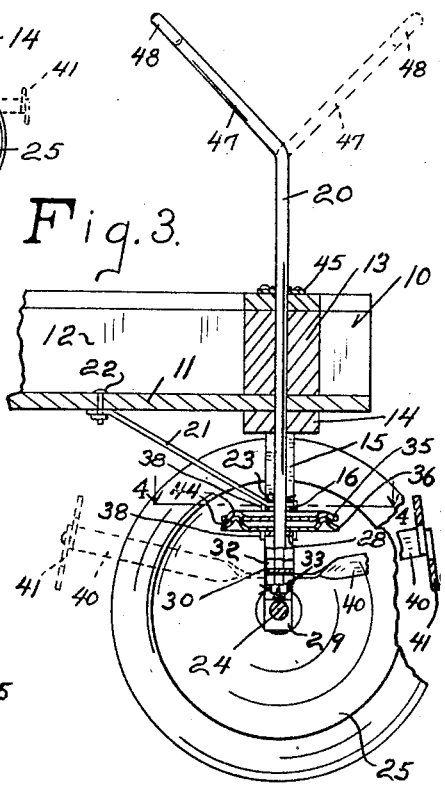
Figure 3 is a detail view taken on the section indicated at 3—3 in Figure 2.

It will be noted that shaft 20 extends vertically above the box for a distance somewhat greater than the depth of the box and is thence inclined at an angle of approximately 45°, as shown in Figures 1 and 3. The inclined portion 47 of shaft 20 terminates in a manually engageable portion or handle 48. The position of the handle indicated in full lines in Figure 1 is such that it may readily be grasped by an adult person, as well as by a child, for the purpose of drawing the wagon. It will be noted that when the handle is adjusted to the full line position indicated in Figure 1, the bumper is turned inwardly beneath the wagon box where it will not interfere with the heels of a person drawing the wagon.

When the wagon handle is turned to the position in which it appears in full lines in Figure 3, the bumper projects forwardly of the axle in a position for use, and the handle projects inwardly in a position to be grasped by an occupant of the wagon.

It is customary for children, in using wagons of this type, to kneel in the box and to use one foot to propel the wagon. It has heretofore been difficult for children, in a proper position for propelling such a wagon, to grasp and manipulate a wagon tongue of the ordinary type. The child's body under such circumstances is or should be fairly erect. The rigid steering device herein disclosed not only projects to a convenient height for the use of a child engaged in propelling the wagon as aforesaid but, being inflexible and unjointed, is adapted to provide the child with a measure of support, thereby relieving the knee and back of the child from strain.

I claim:

1. In a device of the character described, the combination with a wagon having a dirigible axle and front wheels, of a substantially upright steering shaft connected with said axle and extending co-axially with the axis of dirigible movement of said axle above said wagon and provided with a rigid laterally offset portion projecting from said shaft on a side thereof substantially at right angles to the direction of said axle, and a bumper projecting from said axle in a direction opposite to the direction of projection of the offset portion of said handle, whereby said bumper will extend forwardly from said axle when said offset handle portion projects over said wagon for steering purposes and will project rearwardly from said axle when said handle extends forwardly to be grasped for pulling said wagon.

2. In a device of the character described, the combination with an axle, of a strap metal bolster member connected adjacent its ends to said axle and provided intermediate its ends with a substantially horizontal portion, a disk provided with arms abutting said portion and with ears extending from said arms about said portion in interlocking engagement therewith, a second bolster member above said first mentioned bolster member and provided with an intermediate horizontal portion, a second disk provided with arms abutting the intermediate portion of said second bolster and with ears engaging said last mentioned member, a shaft substantially co-axial with said disks, and means operatively connecting said shaft with said axle for the dirigible rotation thereof.

3. In a device of the character described, the combination with an axle, of a strap metal bolster member connected adjacent its ends to said axle and provided intermediate its ends with a substantially horizontal portion, a disk provided with arms abutting said portion and with upstanding ears spaced to receive said portion whereby to key said disk against rotation relative to said member, a second bolster member above said first mentioned bolster member and provided with an intermediate substantially horizontal portion, a second disk provided with arms abutting said portion of said second bolster member and with ears upstanding from said arms in spaced relation adapted to receive said second bolster portion between them whereby to key said second disk against rotation relative to said second member, a shaft substantially co-axial with said disks, means operatively connecting said shaft with said axle for the rotation thereof; and means connected with said shaft and positioned to secure said first mentioned disk, said second mentioned disk, and said second bolster member from separation axially of said shaft from said first mentioned bolster member; one of said disks being formed with an annular rib and the other with a complementary annular groove whereby to be self centering irrespective of said shaft.

4. In a device of the character described, the combination with a wheel-supported axle and a bolster connected therewith, of a wagon body, a strap metal bolster connected with said body and provided with a substantially horizontal intermediate portion, a fifth wheel including plates secured respectively to said bolsters and provided with registering annular groove and rib portions, a shaft disposed substantially vertically in said body and guided for rotation therein, said shaft extending through said plates substantially co-axially with said rib and groove portions, means connecting the upper of said plates in interlocking engagement with said upper bolster, a brace connected with said body and having an apertured portion embracing said shaft and disposed adjacent said last bolster, and a transverse pin in said shaft immediately above the apertured end of said brace.

5. In a device of the character described, the combination with a wagon body operatively supported upon wheels at one of its ends and provided at the other end with a bolster, of a second bolster operatively guided for rotative movement with respect to the first mentioned bolster, a front axle assembled with said second bolster to comprise therewith a unit for dirigible adjustment, wheels upon said axle and a steering and drawing handle rigidly connected with said unit and extending upwardly therefrom above said body along the axis of relative dirigible adjustment between said bolsters, said handle being laterally bent above said body to provide an offset manually engageable portion projecting in a plane including said axis and at right angles to said axle, together with a bumper connected with said unit and projecting therefrom in a direction opposite to the direction in which said manually engageable portion projects, whereby said bumper will project forwardly when said portion is extended over the wagon body for steering purposes and whereby said bumper will be disposed beneath said body when said portion is directly forward as for drawing the device.

WALTER ERNI.